United States Patent
Theobald

(10) Patent No.: US 8,579,250 B1
(45) Date of Patent: Nov. 12, 2013

(54) HIGH PRECISION ENERGY EFFICIENT VALVE

(76) Inventor: Daniel Theobald, Sommerville, MA (US)

( * ) Notice: Subject to any disclaimer, the term of this patent is extended or adjusted under 35 U.S.C. 154(b) by 429 days.

(21) Appl. No.: 12/816,543

(22) Filed: Jun. 16, 2010

(51) Int. Cl.
*F16K 31/08* (2006.01)

(52) U.S. Cl.
USPC ........................................ 251/65; 251/129.09

(58) Field of Classification Search
USPC ......... 251/65, 129.09, 129.1; 137/1; 335/230, 335/234
See application file for complete search history.

(56) References Cited

U.S. PATENT DOCUMENTS

| | | | | |
|---|---|---|---|---|
| 3,178,151 A | * | 4/1965 | Caldwell | 251/129.1 |
| 3,202,166 A | * | 8/1965 | Butler | 137/614.11 |
| 4,422,060 A | * | 12/1983 | Matsumoto et al. | 335/256 |
| 4,533,890 A | * | 8/1985 | Patel | 335/234 |
| 4,621,660 A | * | 11/1986 | Klocke | 137/625.44 |
| 4,829,947 A | * | 5/1989 | Lequesne | 123/90.11 |
| 4,994,776 A | * | 2/1991 | Juncu | 335/234 |
| 5,734,310 A | * | 3/1998 | Ankney et al. | 335/228 |
| 6,246,131 B1 | * | 6/2001 | Sheng | 310/12.24 |
| 6,265,956 B1 | * | 7/2001 | Cascolan et al. | 335/234 |
| 6,791,442 B1 | * | 9/2004 | Schmidt | 335/220 |
| 6,983,923 B2 | * | 1/2006 | Fukui et al. | 251/65 |
| 7,011,076 B1 | * | 3/2006 | Weldon et al. | 123/516 |
| 7,717,396 B2 | * | 5/2010 | Graffin | 251/65 |
| 2010/0252114 A1 | * | 10/2010 | Hoffmann | 137/1 |
| 2011/0107864 A1 | * | 5/2011 | Bai et al. | 74/473.12 |

* cited by examiner

*Primary Examiner* — John K Fristoe, Jr.
*Assistant Examiner* — Umashankar Venkatesan
(74) *Attorney, Agent, or Firm* — Albert J. Brunett

(57) ABSTRACT

A valve and method of controlling a valve, the method including providing a valve member having at least first and second positions and a source of power to the valve member that when activated enables the valve to toggle between the at least first and second positions. The valve is maintained in the at least first and second positions when the power source is deactivated without the need for providing additional power to the valve.

3 Claims, 2 Drawing Sheets

HIGH PRECISION ENERGY EFFICIENT VALVE

BACKGROUND OF THE INVENTION

The present invention relates generally to valves, and more particularly to hydraulic, pneumatic or other valves capable of high precision actuation and/or proportional, energy efficient operation.

SUMMARY OF THE INVENTION

A valve and method of controlling a valve, the method including providing a valve member having at least first and second positions and a source of power to the valve member that when activated enables the valve to toggle between the at least first and second positions. The valve is maintained in at least the first and second positions when the power source is deactivated without the need for providing additional power to the valve.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Figure 1:
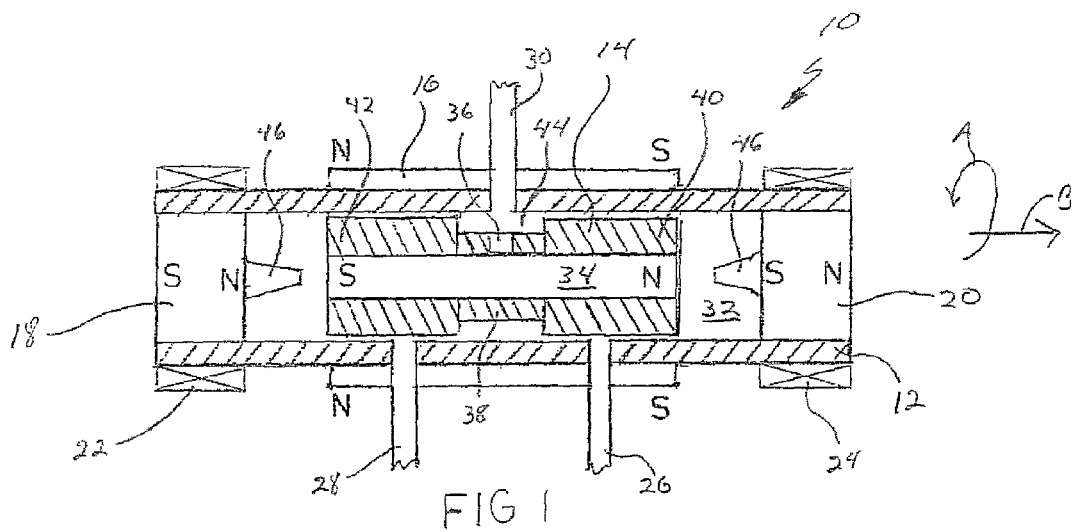
FIG. 1 is a longitudinal cross-sectional view illustrating one embodiment of the valve of the present invention in a closed position.

As FIG. 1 illustrates, one embodiment of the valve of the present invention is generally illustrated with reference numeral 10. The valve 10 essentially is comprised of a housing 12, a first movable member 14, first, second and third permanent magnets 16, 18, and 20, first and second electromagnets 22 and 24, an inlet 26 and first and second outlets 28 and 30.

The valve 10 preferably is a valve used to control a hydraulic or pneumatic system. It is to be understood, however, that the valve 10 is not limited to these applications and can be utilized in any known or future developed system as desired.

Figure 2:
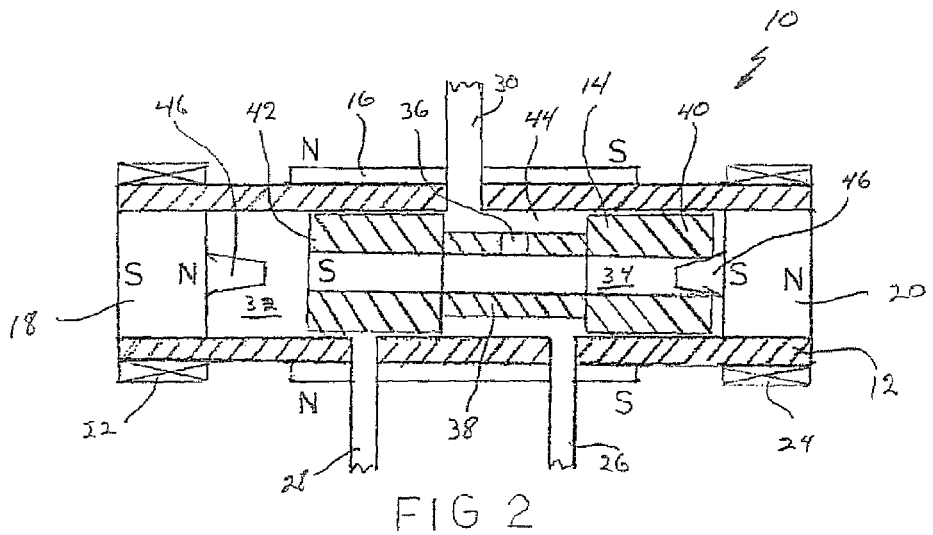
FIG. 2 is a longitudinal cross-sectional view, similar to FIG. 1, illustrating one embodiment of the valve of the present invention in a particular open position.
Figure 3:
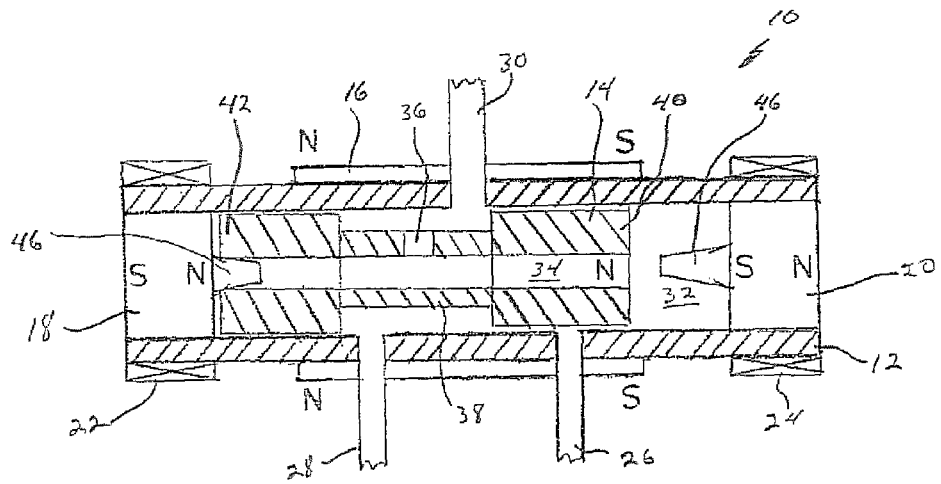
FIG. 3. is a longitudinal cross-sectional view, similar to FIGS. 1 and 2, illustrating one embodiment of the valve of the present invention in another open position.

Briefly, in operation, the movable member 14 moves laterally within the housing 12 by selectively activating the electromagnets 22 and 24 between a first fully closed position (generally illustrated in FIG. 1) to a second fully open position where the inlet 26 can communicate with outlet 30 (generally illustrated in FIG. 2) and to a third fully open position where the outlet 28 can communicate with outlet 30 (generally illustrated in FIG. 3). It is to be understood, however, that the particular size, shape, elements and design as well as the operation of the valve 10 can vary without departing from the teachings of the present invention.

As FIG. 1 illustrates, in one embodiment the housing 12 is substantially a hollow, tubular member that can be made of any desired material, such as metal, plastic, rubber, fabric, resins, fiberglass, composites, nonwovens or any other material. It is to be understood that the housing 12 can be any desired shape or size so long as it functions as described herein.

The movable member 14 is positioned within an interior 32 of the housing 12 and preferably is an elongate member having a central longitudinal aperture 34 extending therethrough and a side wall aperture 36. The movable member 14 substantially performs like a spool member and includes a central portion 38 having a reduced diameter and two opposite end portions 40 and 42 having larger diameters than the central portion 38 that block the first inlet 26 and first outlet 28 as described herein. The movable member 14 preferably is formed from some type of magnetic material that can vary including ferromagnetic, ferrimagnetic, paramagnetic and even diamagnetic materials so long as the movable member 14 functions as described herein.

The reduced diameter of the central portion 38 essentially forms a chamber 44 in communication with both the side wall aperture 36, the first and second outlets 28 and 30 and the first inlet 26. Additionally, if desired, the end portions 40 and 42 may be sealed for sliding engagement with the interior 32 of the housing 12 by either a tight tolerance there between or such as by one or more o-rings or similar members (not illustrated) so long as it provides for the desired sealed sliding engagement.

In one embodiment the first permanent magnet 16 is a substantially hollow tubular member that encircles the middle portion of the tubular housing 12. The first permanent magnet 16 includes apertures for the inlet 26 and the first and second outlets 28 and 30 to extend through and can be formed from any desired material so long as it can be magnetized to the extent needed with north and south poles as illustrated.

As described in more detail below, the magnet 16 maintains the movable spool member 14 in the closed position illustrated in FIG. 1 in the event power may be interrupted to the valve 10. This feature provides a latching or non-backdrivability to the valve 10 and any other mechanisms associated with the valve 10 and essentially is one of the at least three stable states that make up the "tri-stable" feature of the valve 10.

Additionally, the second and third permanent magnets 18 and 20 are secured within the interior 32 of the housing 12 at opposite ends of the housing 12 and sealed to the housing 12 to prevent fluid, air or other material from escaping past the second and third magnets 18 and 20. Both the second and third magnets 18 and 20 also include a plug member 46 for sealing engagement with the longitudinal aperture 34 in the movable spool member 14 as described in more detail below.

The first and second electromagnets 22 and 24 preferably are in the form of rings that encircle the housing 12 on either end of the first permanent magnet 16. The first and second electromagnets 22 and 24 are connected to a source of electrical power (not illustrated) for activating and deactivating the electromagnets 22 and 24 as desired with the desired polarity and preferably are controlled by a control system (not illustrated) that may include, among other electronics, a CPU, memory and software, for example, as needed to operate the valve 10 as described herein. Preferably, the valve 10 includes a number of sensors (not illustrated) that can monitor a variety of variables, including pressure and position, among other variables as desired.

When the valve 10 is used in an hydraulic or pneumatic system (not illustrated) the inlet 26 typically will be connected to a source of hydraulic or air pressure (not illustrated) and the first outlet 28 typically is connected to tank to allow the pressure to be relieved from the valve 10 when desired. In a hydraulic system the source of pressure preferably is a fluid pump and more preferably a variable output fluid pump (not illustrated) and in a pneumatic system the source of pressure may be either a variable output pump or a tank (not illustrated) as desired. The particular design of the valve 10, the type of pressure supply and the functions of the inlet 26 and outlet 28 can vary, however, and the functions of the inlet 26 and outlet 28 may be reversed if desired.

The second outlet 30 typically is connected to some type of actuator (not illustrated) that in turn enables some type of action and/or work to be accomplished by a device (not illustrated) in communication with the valve 10. When used in this context, the valve 10 can be used in any number of hydraulic, pneumatic or other mechanical or other applications such as, for example, various heavy equipment including those used in the construction industry, manufacturing equipment used in factories or the like such as robots and other material handling equipment, and mobile robotics to name but a few applications. It is to be understood that the present invention is not limited to these particular applications and can be utilized in any application or environment as needed.

The interior 32 of the housing 12 essentially forms a chamber surrounding the movable spool member 14. When utilized in a hydraulic or pneumatic application, for example, the interior 32 preferably is primed or filled with hydraulic or other fluid or compressed air but may vary.

When the interior 32 is primed it enables the valve 10 to be more responsive from both a reaction time standpoint as well as a precision standpoint as will be described in more detail below. In short, if the valve 10 is not primed it will take longer to activate the actuator via the second outlet 30 which is undesirable in many applications. Similarly, in many applications it may be preferred to prime the entire system to reduce any delays and provide the needed precision.

When the interior 32 of the valve 10 is either fully or even partially primed the movable spool member 14 typically encounters friction or resistance from the priming fluid or gas as it moves within the housing 12. To reduce this resistance, the movable spool member 14 includes the longitudinal aperture 34 to enable the priming fluid or gas to pass through the movable spool member 14 and assist in maintaining a balanced or substantially balanced pressure within the housing 12. This design also reduces or eliminates the need for any additional outlets (not illustrated) proximate the ends of the housing 12 for fluid or gas to flow out of the valve 10 to enable movement of the movable spool member 14 in the housing 12.

As FIGS. 2 and 3 generally illustrate, the second and third permanent magnets 18 and 20 at opposite ends of the housing 12 essentially provide a non-mechanical "latch" feature of the present invention that requires no additional power or energy when the valve 10 is in the fully open positions. This no additional power latch feature is obtained by the permanent magnets 18 and 20 that attract and maintain the magnetic movable spool member 14 in position against either magnet 18 or 20 with the plugs 46 plugging the longitudinal aperture 34 in the movable spool member 14. These two positions of the valve 10 illustrated in FIGS. 2 and 3 make up the second and third stable states of the valve 10 which when combined with the stable state of FIG. 1 as described above form the "tri-stable" feature of the valve 10.

This no additional power latch feature is an important feature in many applications including, for example, those applications that include an actuator in communication with the valve 10. In use, many machines or other items rely on power for operation and when that power is disrupted it is desirable to keep the machine in a particular state for safety or other operational reasons.

This latch feature essentially provides a non-backdrivable feature to the valve 10 and in-turn any actuator or other member associated with the valve 10 to keep the machine or actuator in a particular position in the event power is disrupted. Additionally, the latch feature of the present invention has no real moving parts for keeping the movable spool member 14 in position which leads to increased efficiency, reliability, reduced costs, ease of assembly and no need for service or parts replacement. Although this latch feature is preferably performed by the magnets 18 and 20, it is to be understood that any type of latch member, method or mechanism can be used so long as it requires no additional power without departing from the teachings of the present invention.

The design of the second and third permanent magnets 18 and 20 to include the plugs 46 also provides a damping feature to the valve 10 particularly when the valve 10 is primed. As can be discerned from the drawings, as the movable spool member 14 approaches the plug 46 on the magnet 20, for example, fluid or gas in the interior 32 of the housing 12 between the plug 46 and magnet 20 flows through the longitudinal aperture 34 and provides a type of cushion to the movable spool member 14.

As the movable spool member 14 gets closer and closer to the plug 46 the gap there between narrows and the sloped surface of the plug 46 provides variable closure of the gap. This variable, gradual closing of the gap while enabling fluid or gas to escape to the other side of the movable spool member 14 through the aperture 34 provides a damping movement which is desirable to reduce wear on the parts of the valve 10 and reducing or eliminating any noise from contact of the movable spool member 14 against the magnets 18 or 20.

Essentially, due to the first, second and third permanent magnets 16, 18 and 20 the only power required to move the movable spool member 14 from the closed position of FIG. 1 to the open positions of the other drawings is the electrical power provided to the first and second electromagnets 22 and 24. Although this power can be any desired application of power, preferably a small pulse of electricity is provided to the electromagnets 22 and 24.

Referring to FIG. 1, this small pulse of electricity provided to electromagnet 20, for example, initially will be provided in the direction of arrow "A" to generate a magnetic force in the direction of arrow "B" to move the movable spool member 14 in the direction of arrow B. This small pulse will be sufficient to generate a force to enable the movable spool member 14 to overcome the attractive force of the first permanent magnet 16 and move the spool member 14 toward the third permanent magnet 20.

At a certain designated point, as the spool member 14 moves toward the magnet 20, the attractive force of the magnet 20 overcomes the attractive force of the magnet 16. At this point the power to the electromagnet 24 can be cut and the spool member 14 becomes engaged with the plug 46 of the magnet 20 and will be maintained in that position with no additional power being required to the valve 10. Although the strength of the permanent magnets 16, 18 and 20 are predetermined and can vary, the strength of the first permanent magnet 16 preferably is somewhat less than the strength of the second and third permanent magnets 18 and 20 so that the movable spool member 14 can be maintained in the open positions illustrated in FIGS. 2 and 3.

Figure 4:
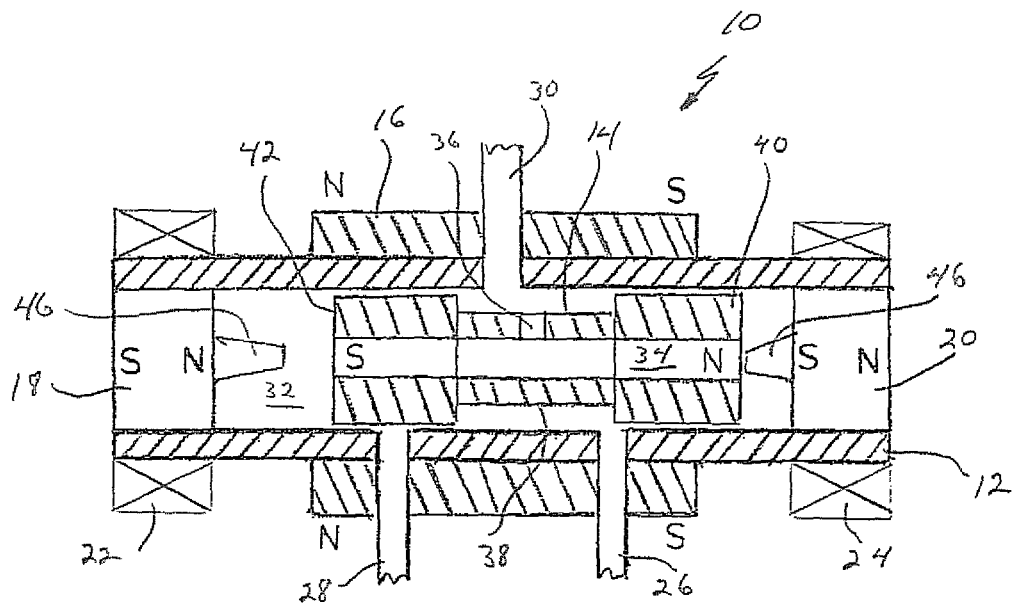
FIG. 4 is a longitudinal cross-sectional view, similar to FIGS. 1-3, illustrating one embodiment of the valve of the present invention in a partially open position.
Figure 5:
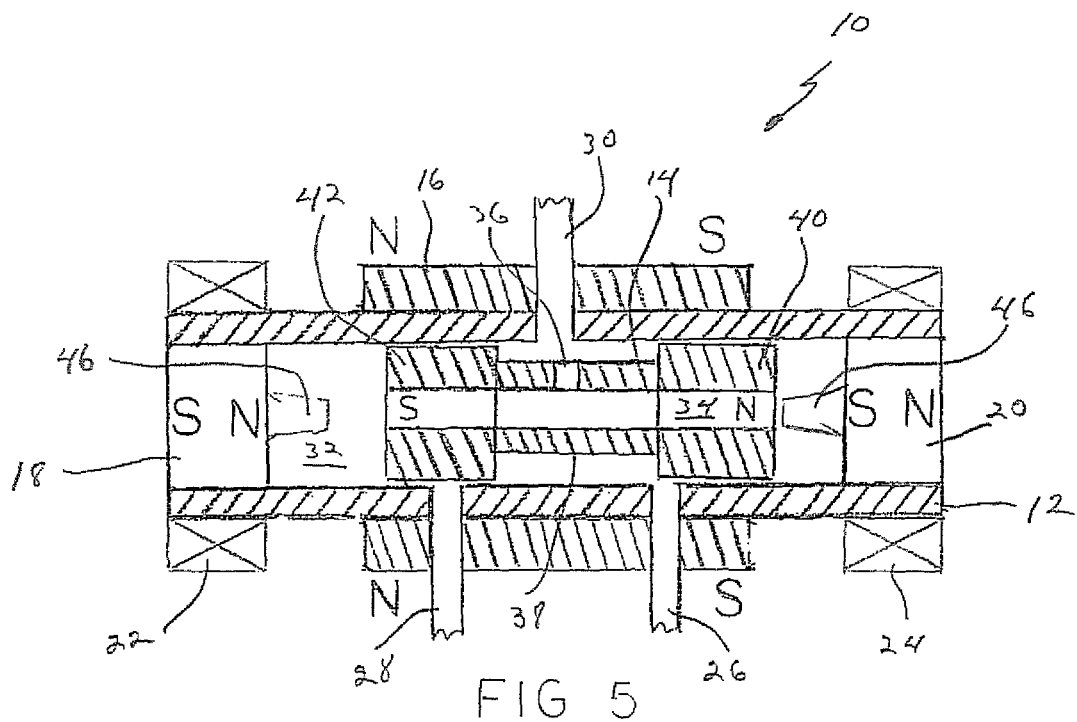
FIG. 5 is a longitudinal cross-sectional view, similar to FIGS. 1-4, illustrating one embodiment of the valve of the present invention in another partially open position.

As FIGS. 4 and 5 generally illustrate, the valve 10 is also capable of having a variable opening of the inlet 26 rather than just fully open or closed as illustrated in FIGS. 2 and 1 respectively. For example, in FIG. 4 the outlet 26 is only open approximately half way while in FIG. 5 the outlet 26 is only open a small amount which can vary and include any position between fully open and fully closed.

This feature enables the valve 10 to be opened in increments to provide different levels of pressure when the valve 10 is used in a hydraulic or pneumatic application or merely prevent different flow rates when used in other applications. The ability of the valve 10 to provide proportional actuation is a highly desired feature when used to provide precise control of a system, such as, for example, when the valve 10 is used in a robotic application for fine motion control of the robot or for any other desired application.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for example, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A method of controlling a hydraulic actuator valve, comprising:
    providing a valve member for regulating the flow of hydraulic fluid through the valve member having at least first, second and third positions;
    providing a source of power to the valve member that when activated enables the valve to toggle between the first, second and third positions as desired; and
    maintaining the valve in the first, second or third positions with the first, second, or third permanent magnets respectively when the power source is deactivated without the need for providing any additional power to the valve.

2. The method as defined in claim 1, wherein at least two of the first, second and third positions each has a discrete outflow path associated therewith.

3. A method of controlling a hydraulic actuator valve, comprising:
    providing a valve member for regulating the flow of hydraulic fluid through the valve member having at least first and second positions and a variety of positions intermediate the first and second positions;
    providing a source of power to the valve member that when activated enables the valve to toggle between the first and second positions as desired; and
    maintaining the valve in the first and second positions and any intermediate position with the first, second or third permanent magnets respectively when the power source is deactivated without the need for providing any additional power to the valve.

* * * * *